United States Patent
Yang et al.

(10) Patent No.: US 9,262,850 B2
(45) Date of Patent: Feb. 16, 2016

(54) DESCRIPTIVE FRAMEWORK FOR DATA VISUALIZATION

(71) Applicant: Business Objects Software Ltd., Dublin (IE)

(72) Inventors: Yubin Yang, Shanghai (CN); Jia Liu, Shanghai (CN); Xuzhou Li, Shanghai (CN); Gang Tao, Shanghai (CN); Weiqiang Ye, Shanghai (CN)

(73) Assignee: Business Objects Software Ltd., Dublin (IE)

( * ) Notice: Subject to any disclaimer, the term of this patent is extended or adjusted under 35 U.S.C. 154(b) by 241 days.

(21) Appl. No.: 13/960,818

(22) Filed: Aug. 7, 2013

(65) Prior Publication Data
US 2015/0040041 A1 Feb. 5, 2015

(30) Foreign Application Priority Data

Jul. 30, 2013 (CN) .......................... 2013 1 0325767

(51) Int. Cl.
G06F 3/00 (2006.01)
G06T 11/20 (2006.01)
G06F 17/30 (2006.01)

(52) U.S. Cl.
CPC ........ *G06T 11/206* (2013.01); *G06F 17/30554* (2013.01)

(58) Field of Classification Search
CPC .............................................. G06F 17/30554
USPC ................................................ 715/762, 764
See application file for complete search history.

(56) References Cited

U.S. PATENT DOCUMENTS

| | | | |
|---|---|---|---|
| 6,492,989 B1 | 12/2002 | Wilkinson | |
| 6,995,768 B2 | 2/2006 | Jou et al. | |
| 7,512,875 B2 | 3/2009 | Davis | |
| 7,757,204 B2 | 7/2010 | Fildebrandt et al. | |
| 7,880,749 B2 | 2/2011 | Favart et al. | |
| 7,890,452 B2 | 2/2011 | Moore et al. | |
| 7,925,985 B2 | 4/2011 | Moore | |
| 7,949,946 B2 | 5/2011 | Mollicone et al. | |
| 8,069,437 B2 | 11/2011 | Aigner et al. | |
| 8,099,674 B2 * | 1/2012 | Mackinlay et al. | 715/764 |
| 8,225,223 B2 | 7/2012 | Becerra | |
| 8,381,180 B2 | 2/2013 | Rostoker | |
| 8,578,277 B2 | 11/2013 | Cory et al. | |
| 8,654,125 B2 | 2/2014 | Gibson | |
| 8,689,174 B2 | 4/2014 | Shaburov et al. | |
| 8,959,443 B2 * | 2/2015 | Law | 715/764 |
| 2005/0060300 A1 | 3/2005 | Stolte et al. | |
| 2007/0143673 A1 | 6/2007 | Tolle et al. | |

(Continued)

OTHER PUBLICATIONS

Jeffrey Heer et al., Interactive Dynamics for Visual Analysis: A taxonomy of tools that support the fluent and flexible use of visualizations, ACM Queue, Feb. 1, 2012, 26 pages.

(Continued)

*Primary Examiner* — William Titcomb
(74) *Attorney, Agent, or Firm* — Horizon IP Pte. Ltd.

(57) ABSTRACT

Described herein is a descriptive framework to facilitate data visualization. In accordance with one aspect of the framework, one or more module manifests are provided, wherein a module manifest describes a module that represents a particular component of a visualization. A chart manifest may be used to coordinate the one or more module manifests. A visualization may be rendered based on the chart manifest.

20 Claims, 19 Drawing Sheets

(56) References Cited

U.S. PATENT DOCUMENTS

2012/0159298 A1   6/2012   Fisher et al.
2014/0040061 A1   2/2014   Duncker et al.

OTHER PUBLICATIONS

Jock Mackinlay, Automating the Design of Graphical Presentations of Relational Information, ACM Transactions on Graphics, Apr. 1986, pp. 110-141, vol. 5, No. 2, ACM, CA.

* cited by examiner

```
{ 'id': '',
  'name': '',
  'type': 'SUPPLEMENTARY|CHART|CONTAINER|BEHAVIOR',
  'base': BASE_MODULE_ID, //definition inheritance
  'properties': {},//define properties, we support hierarchy
  'events': {}, //list all supported events here
  'css': {} //define all supported css here
}
```
⎱ 402

*Fig. 4a*

```
...
'layout': '', //to reference the default layout used by this container
...
```
⎱ 412

*Fig. 4b*

```
{
  'id': '',
  'name': '',
  'base': '',
  'properties': {},
  'css': {},
  'layout': {} //describe the layout spec which can be used
}
```
⎱ 422

*Fig. 4c*

```
{
  'id': '',
  'name': '',
  'base': '',
  'root': 'ROOT_CONTAINER_MODULE_REFERENCE',
  'dependencies': {
     'attributes': '', //value dependency
     'events': ''
  }
}
```

```
'module_reference_name': {
  'id': '', //the module id you are referencing to
  'configure': {
    'properties': {
      //detail properties
    }
  }
}
```

*Fig. 5a*

```
'mainTitle': {
  'id': 'TITLE_MODULE_ID',
  'configure': {
    'properties': {
      'alignment': 'center'
    }
  }
},
'subTitle': {
  'id': 'TITLE_MODULE_ID',
  'configure': {
    'properties': {
      'alignment': 'right'
    }
  }
}
```

*Fig. 5b*

```
'container_module_reference_name': {
    'id': '',
    'configure': {},
    'modules': {
      'layout': 'LAYOUT_MODULE_REFERENCE',
      'sub_modules_i': {
        'id': '',
        'layout': {
          'col': 0,
          'row': 1 //layout info for this sub module. Has to be matched with the
layout module
//currently being used.
        }
      }
      ...
    }
}
```

- 604 → 'modules'
- 606 → 'sub_modules_i'
- 608 → 'layout'
- 602 (box)

Fig. 6

```
'module_reference_name': {
    'id': '', //the module id you are referencing to
    'behaviors': {
      'behavior_module_reference': {
        'id': 'SELECTION_BEHAVIOR_MODULE_ID'//the behavior module id you
are referencing to
        'properties': '' //you can also specify property values for this reference
      }
    }
}
```

- 704 → 'id'
- 706 → 'properties'
- 702 (box)

Fig. 7

```
'dependencies': {
  'attributes': [{
    {
    targetModule : 'legend', //module path
    target : 'colorPalette', //target function
    sourceModule : 'main.plot' ,//module path
    source : 'colorPalette' //source function
    }
  }], //value dependency
}
```
802, 806, 804, 808 — 801

*Fig. 8*

```
'dependencies': {
  'events': [{
    targetModule : 'tooltip',
    listener : 'hideTooltip', //event listener
    sourceModule : 'main.plot',
    type : 'hideTooltip' //event type
  }]
}
```
902

*Fig. 9*

| size() | Required | |
| width()/height() | Required | |
| properties() | Required | |
| data() | Required | |
| dispatch() | Optional | Implement this interface if your module support events |

| getPreferredSize() | Required | Report your preferred size to layout manager |

| properties() | Required | |

| config() | Required | Sub modules configuration will be passed to container module |

| parent() | Optional | If you chart module supports multiple case |

```
var module = {
'id' : 'sap.viz.modules.xy.bar',
'type' : Constants.Module.Type.Chart,
'name' : 'xy bar module',
'properties' : {
'colorPalette' : {
'name' : 'colorPalette',
'supportedValueType' : 'StringArray',
'defaultValue' : Constants.SAPColorSingleAxis,
'description' : 'Set axis 1 color palette.'
}
},
'events' : {
'selectData' : Constants.Module.Event.SelectData.desc,
'deselectData' : Constants.Module.Event.DeSelectData.desc,
'showTooltip' : Constants.Module.Event.TooltipShow.desc,
'hideTooltip' : Constants.Module.Event.TooltipHide.desc
}
'css' : {
'.viz-bar-data-label' : {
'description' : 'Define style for the data label.',
'value' : {
'fill' : '#333333',
'font-family' : "'Open Sans', Arial, Helvetica, sans-serif",
'font-size' : '12px',
'font-weight' : 'normal'
}
}
}
};
}
```

```
var chart = {
id : 'viz/bar',
name : 'Bar Chart',
root: {
id: 'COMMON_CONTAINER_REFERENCE',
modules : {
layout: 'CHART_BASIC_LAYOUT_MODULE_REFERENCE',
title : {
id : 'sap.viz.modules.title',
configure : {
propertyCategory : 'title',         1204
properties: {
'alignment': 'left' //make the default title alignment of our bar chart to left
instead of center
//defined in the title module
}
}
},
legend : {
id : 'sap.viz.modules.legend',
configure : {
propertyCategory : 'legend'         1206
}
},
tooltip : {
id : 'sap.viz.modules.tooltip',
configure : {
propertyCategory : 'tooltip',       1208
properties : {
chartType : 'bar',
orientation : 'left'
}
}
},
main : {
id : 'sap.viz.modules.commonContainer',
behaviors : {                       1210
'interaction' : {
id : 'sap.viz.modules.behavior.interaction',
configure : {
propertyCategory : 'interaction',   1211
properties : {
supportedEventNames: ['mouseup', 'mousemove', 'touchstart']
}
}
}
},
```

```
modules : {
//use the default layout which is border layout here
xAxis : {
id : 'sap.viz.modules.axis',
layout: {                       ⎱ 1212
pos: 'south'
},
configure : {       ⎱ 1213
propertyCategory : 'xAxis',
properties : {
type : 'value',
position : 'bottom'
}
}
},
yAxis : {
id : 'sap.viz.modules.axis',
layout: {                       ⎱ 1214
pos: 'west'
},
configure : {
propertyCategory : 'yAxis',
properties : {
type : 'category',
position : 'left',
gridline : {
visible : false
}
}}}
plot : {
id : 'sap.viz.modules.xy.bar',
layout: {                       ⎱ 1216
pos: 'center'
},
configure : {
propertyCategory : 'plotArea'
}
}}
},
```

```
dependencies : {      1218
attributes : [ {
targetModule : 'main.xAxis',
target : 'scale',
sourceModule : 'main.plot',
source : 'primaryScale'
},{
targetModule : 'main.yAxis',
target : 'scale',
sourceModule : 'main.plot',
source : 'categoryScale'
},{
targetModule : 'legend',
target : 'colorPalette',
sourceModule : 'main.plot',
source : 'colorPalette'
} ],                   1220
events : [ {
targetModule : 'tooltip',
listener : 'showTooltip',
sourceModule : 'main.plot',
type : 'showTooltip'
}, {
targetModule : 'tooltip',
listener : 'hideTooltip',
sourceModule : 'main.plot',
type : 'hideTooltip'
} ]
}
};
```
1202

*Fig. 12c*

```
var multiBarChart = {
    id: 'viz/multi_bar',
    name: 'Multiple Bar Chart',
    root: {
      id: 'COMMON_CONTAINER_REFERENCE',
      modules: {
       layout: 'CHART_BASIC_LAYOUT_MODULE_REFERENCE',
       legend: {/*same as legend in bar chart above*/},      1202
       tooltip: {/*same as tooltip in bar chart above*/},
       main:{
          id : "sap.viz.modules.tablecontainer',
          configure : {
              propertyCategory : 'multiLayout'
          },
          behaviors: {
            'interaction': {/*same as behaviors in bar chart above*/}
          },
          modules: {
            plot: {
              id: 'sap.viz.modules.xycontainer',
              /*same as xycontainer in bar chart above*/
            }
          }
       }}
    },
    dependecies: {
      attributes : [
      {
       targetModule: 'main',
       target: 'primaryDataRange',
       sourceModule: 'main.plot.plot',
       source: 'primaryDataRange'
      },
```

Fig. 13a      1302

```
{
    targetModule: 'main.plot.plot',
    target: 'primaryDataRange',
    sourceModule: 'main',
    source: 'primaryDataRange'
},
{
    targetModule: 'main.plot.xAxis',
    target: 'scale',
    sourceModule: 'main.pot.plot',
    source: 'primaryScale'
},
{
    targetModule: 'main.plot.xAxis',
    target: 'title',
    sourceModule: 'main.pot.plot',
    source: 'primaryAxisTitle',
},
{
    targetModule: 'main.plot.yAxis',
    target: 'scale',
    sourceModule: 'main.plot.plot',
    source: 'categoryScale'
},
{
    targetModule: 'legend',
    target: 'colorPalette',
    sourceModule: 'main.plot.plot',
    source: 'colorPalette'
}
],
```

*Fig. 13b*  1302

```
events: [{
    targetModule: 'main.interaction',
    listener: 'registerEvent',
    sourceModule: 'main',
    type: 'initialized.interaction'
},
{                           ~ 1302a
    targetModule: 'tooltip',
    listener: 'showTooltip',
    sourceModule: 'main',
    type: 'showTooltip'
},
{                           ~ 1302b
    targetModule: 'tooltip',
    listener: 'hideTooltip',
    sourceModule: 'main',
    type: 'hideTooltip'
},
{                           ~ 1304a
    targetModule: 'main.interaction',
    listener: 'highlightedByLegend',
    sourceModule: 'legend',
    type: 'highlightedByLegend'
},
{                           ~ 1304b
    targetModule: 'legend',
    listener: 'deselectLegend',
    sourceModule: 'main.interaction',
    type: 'deselectLegend'
}]
}
};
```

*Fig. 13c*                                    1302

DESCRIPTIVE FRAMEWORK FOR DATA VISUALIZATION

TECHNICAL FIELD

The present disclosure relates generally to data visualizations, and more specifically, to a descriptive framework for composing data visualizations.

BACKGROUND

Graphical representations of data can greatly facilitate analysis and understanding of the data. Different types of charts (or graphs), such as a bar chart, an area chart, a pie chart, a line chart, a column graph, a scatter plot, and so forth, may be generated from the data set to suit different needs. Such visualizations are instrumental in facilitating the understanding of complex business data sets.

A developer may use chart (or charting) libraries to add web-based visualization support to web applications. A chart library typically provides commands that are used to render a visualization. It may include a library of predefined chart components (e.g., legends, axes, titles, tooltip, plot area, etc.) that may be used as building blocks for a new visualization. Different charts may share several common chart parts. For instance, a bar chart and a line chart may share the same legend, while a multi-bar chart can share the same plot area as a single bar chart.

However, one of the problems with conventional chart libraries is that although different charts may share common chart parts, such chart parts are not easily reusable. To generate a new visualization, all the different chart parts have to be redefined from the code level. In addition, each customer may have different requirements. For example, a customer may require a pie chart to have two titles (e.g., main title and sub title) or a bar chart to have a value axis on the top. However, chart libraries typically only support pre-defined charts, and customers are not able to customize or extend the charts by themselves. Therefore, if the chart library only provides a default pie chart with one title or a default bar chart with a value axis at the bottom, such charts cannot be generated unless the chart library is customized to accommodate such specific requirements.

Therefore, there is a need for an improved framework that addresses the above-mentioned challenges.

SUMMARY

A descriptive framework for facilitating data visualization is described herein. In accordance with one aspect of the framework, pre-defined module manifests are provided in a manifest system stored in a memory module, wherein a pre-defined module manifest describes a module that represents a particular component of a visualization. A new module manifest may be generated based on at least one of the pre-defined module manifests. A chart manifest referencing the new module manifest or at least one of the pre-defined module manifests may be provided. The visualization may then be rendered based on the chart manifest.

In accordance with another aspect of the framework, one or more module manifests are provided, wherein a module manifest describes a module that represents a particular component of a visualization. A chart manifest may be used to coordinate the one or more module manifests. A visualization may then be rendered based on the chart manifest.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 4a shows an exemplary structure of a module manifest file;
FIG. 4b shows an exemplary item to be added to a structure of a module manifest file for a container-type module;
FIG. 4c shows an exemplary structure for a layout module manifest file;
FIG. 4d shows an exemplary structure of a chart manifest file;
FIG. 5a shows an exemplary structure of a module reference;
FIG. 5b shows exemplary structures for main title and sub title respectively;
FIG. 6 shows an exemplary structure of another module reference;
FIG. 7 shows an exemplary structure of a module reference with behavior configuration;
FIG. 8 shows an exemplary structure of a value dependency;
FIG. 9 shows a structure of an event dependency;
FIGS. 10a-e show exemplary interface definitions for modules;
FIG. 11 illustrates an exemplary bar module manifest sample;
FIGS. 12a-c illustrate an exemplary bar chart manifest sample;
FIGS. 13a-c illustrate a multiple bar chart manifest sample.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for facilitating a descriptive approach to composing data visualizations is described herein. In accordance with some implementations, visualizations are composed by first developing smaller reusable modules that represent components or parts of a chart, such as the axis, legend, title, container, plot area, etc. Unlike conventional systems where chart components have to be defined from code level, the modules according to the present framework may be defined using configuration files or module manifests. They may stand alone or be combined with other modules via at least one chart manifest (or configuration file) to form a visualization. Existing modules from a manifest system 127 may be used to compose the visualization. In addition, existing modules may be extended or customized to generate new modules to add to the manifest system 127. A chart manifest describes the visualization in terms of its component modules and relationships between the component modules. The chart manifest may be extensible and easily authored by the user without need for advanced programming knowledge or skill.

Accordingly, the present framework advantageously achieves reusability, customizability and extensibility. It enables a chart library provider's customers to tailor their chart libraries according to their requirements by customizing or extending existing module or chart manifests to create new module or chart types. In addition, customers can implement their own modules and add them to existing data visualizations or create new visualizations.

The framework described herein may be implemented as a method, a computer-controlled apparatus, a computer process, a computing system, or as an article of manufacture such as a computer-usable medium. These and various other features will be apparent from the following description.

Figure 1:
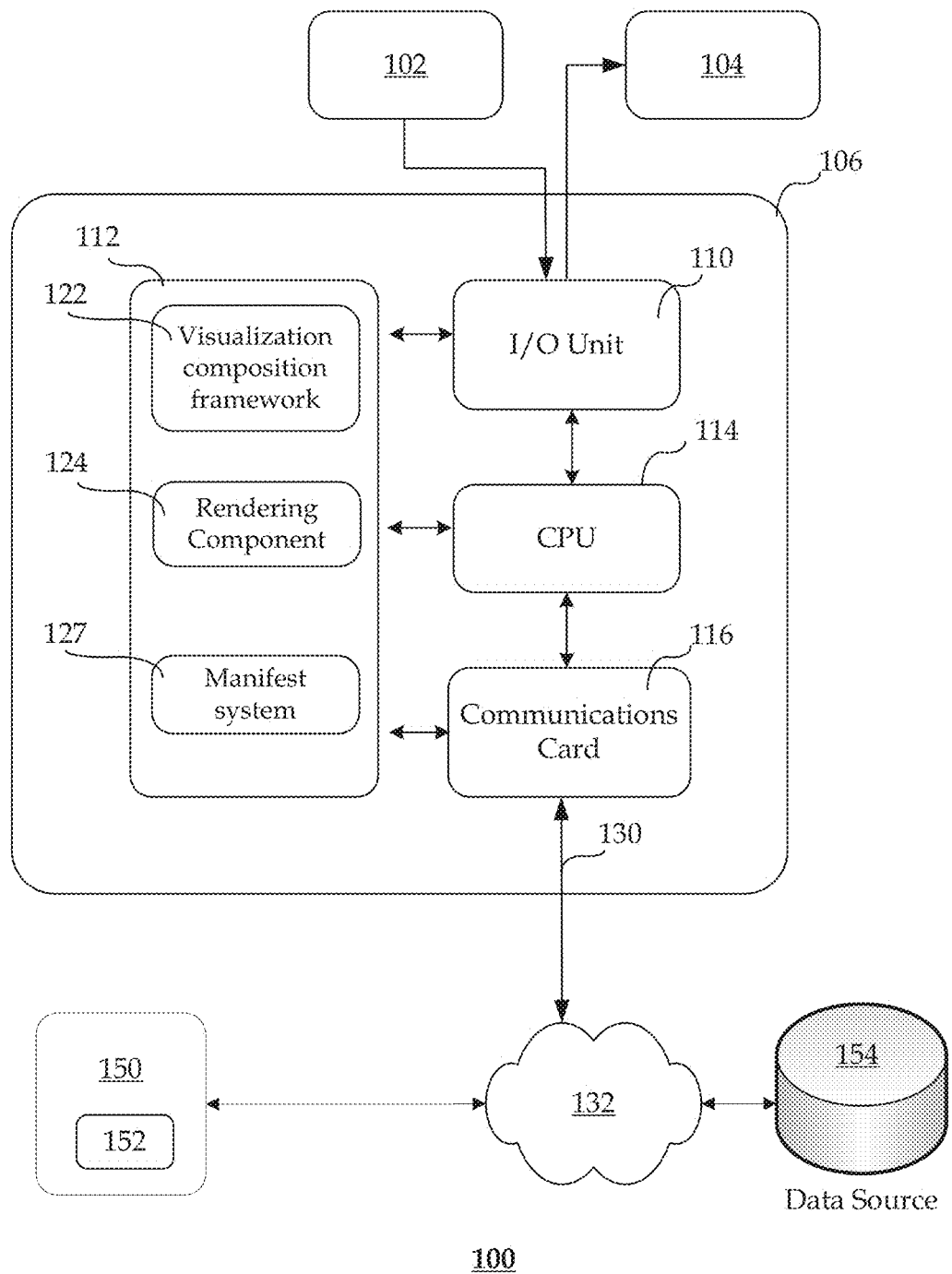
FIG. 1 is a block diagram illustrating an exemplary system.

FIG. 1 is a block diagram illustrating an exemplary system 100 that may be used to implement the framework described herein. Generally, system 100 may include a computer system 106 communicatively coupled to an input device 102 (e.g., keyboard, touchpad, microphone, camera, etc.) and an output device 104 (e.g., display device, monitor, printer, speaker, etc.). Computer system 106 also may include a communications card or device 116 (e.g., a modem and/or a network adapter) for exchanging data with network 132 using a communications link 130 (e.g., a telephone line, a wireless network link, a wired network link, or a cable network). Network 132 may be a local area network (LAN) or a wide area network (WAN). The computer system 106 may be communicatively coupled to one or more other computer systems 150 via network 132. For example, the computer system 106 may act as a server and operate in a networked environment using logical connections to one or more client computers 150. Client computers 150 may include components similar to the computer system 106, and may be in the form of a desktop computer, mobile device, tablet computer, communication device, browser-based device, etc. A user at the client computer 150 may interact with a user interface 152 to communicate with visualization composition framework 122.

The computer system 106 may be communicatively coupled to one or more data sources 154. Data source 154 may be, for example, any database (e.g., relational database, in-memory database, etc.), an entity (e.g., set of related records), or a data set included in a database. Data source 154 may be any suitable data, including a buffer or data that resides in a local volatile memory, and need not directly relate to a database.

It should be appreciated that the different components and sub-components of the computer system 106 may be located on different machines or systems. It should further be appreciated that the components of the client computer 150 may also be located on the computer system 106, or vice versa.

Computer system 106 includes a central processing unit (CPU) 114, an input/output (I/O) unit 110, and a memory module 112. Other support circuits, such as a cache, a power supply, clock circuits and a communications bus, may also be included in computer system 106. In addition, any of the foregoing may be supplemented by, or incorporated in, application-specific integrated circuits. Examples of computer system 106 include a handheld device, a mobile device, a personal digital assistance (PDA), a workstation, a server, a portable laptop computer, another portable device, a minicomputer, a mainframe computer, a storage system, a dedicated digital appliance, a device, a component, other equipment, or some combination of these capable of responding to and executing instructions in a defined manner.

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory module 112 serves to store machine-executable instructions, data, and various software components for implementing the techniques described herein, all of which may be processed by CPU 114. As such, the computer system 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In one implementation, the memory module 112 of the computer system 106 includes a visualization composition framework 122, a rendering component 124 and a manifest system 127. Visualization composition framework 122 may include a set of function modules or programs designed to facilitate a descriptive approach to composing visualizations that are reusable, customizable and extensible. The visualizations may be composed in the form of chart manifest files (or configuration files) that are stored in the manifest system 127, which will be described in more detail later. Rendering component 124 may retrieve data (e.g., chart manifest files) from the manifest system 127 and/or or data source 154 and generate a visual representation based on the data.

Manifest system 127 is similar to a configuration registry that manages numerous manifests (or manifest files). Besides managing manifests, the manifest system 127 may further support manifest inheritance and extension so as to facilitate manifest creation and/or maintenance. In some implementations, each manifest is a configuration file that is authored using simple human-readable language, such as JavaScript Object Notation (JSON), Extensible Markup Language (XML), etc., that can be written or read conveniently without advanced programming knowledge or skill.

In some implementations, the manifest may be a module manifest or a chart manifest. A module manifest describes a module, which is the smallest unit that makes up a visualization (or chart). A module manifest defines a new module by, for example, describing the features of the module (e.g., type, properties, etc.). A chart manifest is similar to an application that coordinates the modules to behave as expected for the visualization. A chart manifest defines a new chart by describing how the chart is composed by existing modules (e.g., hierarchical relationship) and how the modules interact. A module manifest or chart manifest may generate a new module or chart respectively by customizing, extending or reusing one or more existing modules or charts. Different interfaces may be defined for different module types to ensure they coordinate well together. Users may implement their own modules and use them in charts if they are compatible with these interfaces.

Manifest system 127 may further include one or more components or application programming interfaces (APIs) for providing manifest management functions. For instance, manifest system 127 may include a "registerCategory" API for creating a new category. A "category" generally refers to a type of manifest. For example, manifest system 127 may manage the module and chart manifests in two categories: chart category and module category. Manifest system 127 may further include a "register" API for mounting a new manifest into a category, an index system that is based on manifest "id" and supports referencing of one or more easy-to-use accessor APIs for locating and accessing configuration items in manifest, and/or "base/abstract" keywords to enable inheritance that can be used to extend and reuse existing manifests easily.

In some implementations, manifest system 127 provides one or more pre-defined module manifests. Each module represents a particular type of component of a visualization, such as a legend, title, axis, plot, tooltip, and so forth. Different types of modules may be defined for different types of components of a visualization. Generally, there may be five types of modules: (1) container; (2) layout; (3) supplementary; (4) chart; and (5) behavior.

A container-type module is one that contains other modules. It serves to coordinate its sub-modules in, for example, a data dispatch, an event dispatch, etc. Each container-type module may specify a particular layout module to arrange the visual parts represented by its sub-modules in a visualization. Exemplary container-type modules may include, but are not limited to, commonContainer modules, tableContainer modules, matrixContainer modules, and so forth. Each container-type module may represent a different coordination pattern. For example, a tableContainer module and a matrixContainer module may implement different data dispatch algorithms.

A layout-type module serves to arrange the sub-modules of the container-type module that it is assigned to. It is defined separately from the container-type module, and allows the user to specify different layouts for a single container-type module. Exemplary layout-type modules may include, but are not limited to, gridLayout, xyLayout, chartLayout, and so forth.

A supplementary-type module does not represent data directly, but serves to facilitate user interpretation of the data. Exemplary supplementary-type modules include, but are not limited to, title module, axis module (e.g., value axis module, category axis module, etc.), legend module (e.g., color legend module, size legend module, etc.), tooltip module, and the like.

A chart-type module directly represents data in a visual form. Exemplary chart-type modules include, but are not limited to, a bar module (e.g., column bar module, stacked bar module, etc.), line module, pie module, scatter or bubble plot module, radar module, and the like.

A behavior-type module serves to define and control the behavior of the visualization. Exemplary behavior-type modules include, but are not limited to, selection module, export module and so forth.

Figure 2:
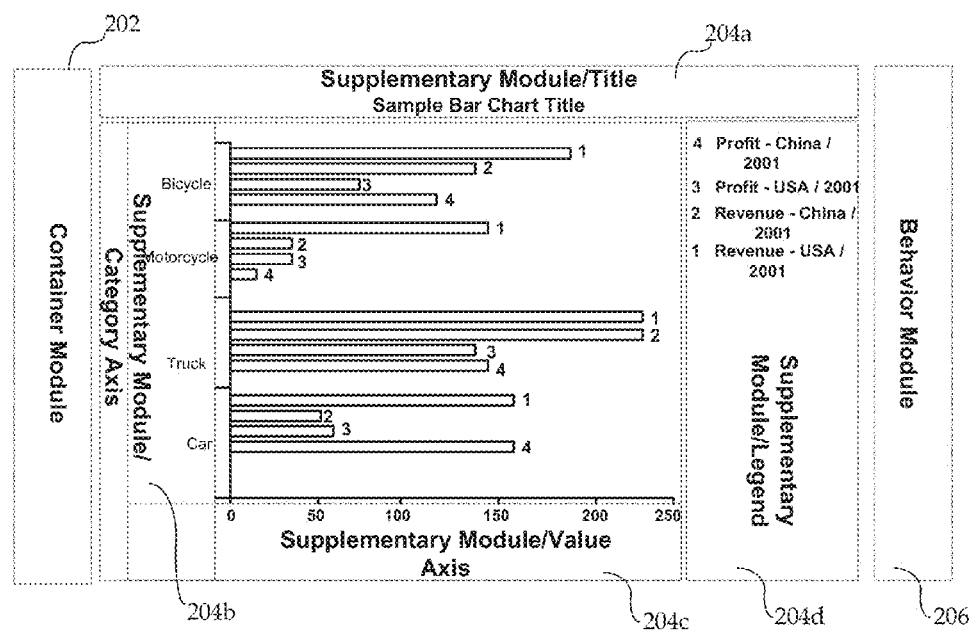
FIG. 2 shows different exemplary modules defined for a real chart.

FIG. 2 shows different exemplary modules defined for a real chart 200. As shown, the chart 200 may be composed by a container module 202, a supplementary module/title 204a, a supplementary module/category axis 204b, a supplementary module/value axis 204c, a supplementary module/legend 204d and a behavior module 206.

Figure 3A:
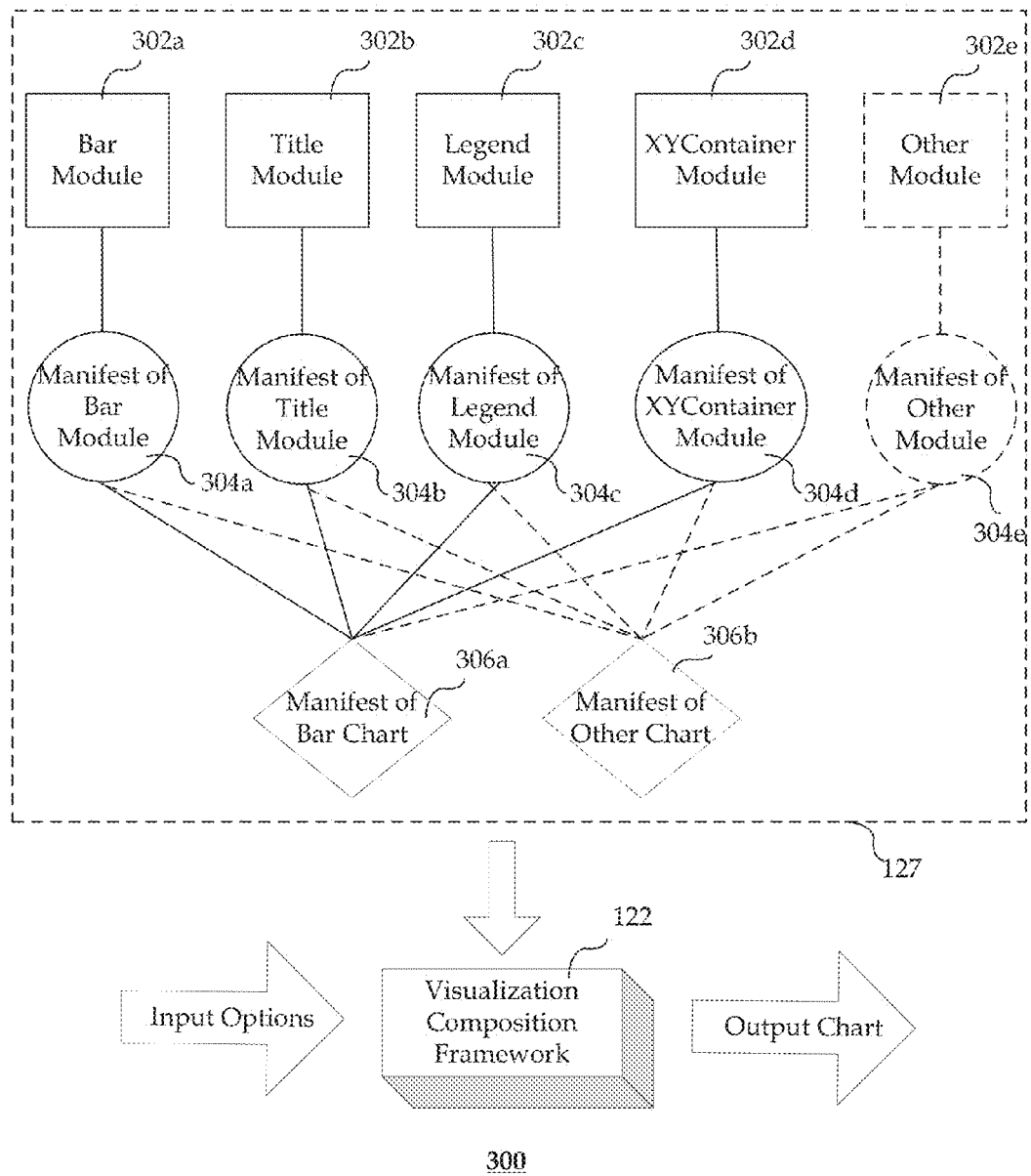
FIG. 3a shows an exemplary architecture.

FIG. 3a shows an exemplary architecture 300 of the system 106. It should be noted that in the following discussion, reference may be made, using like numerals, to the features described in FIG. 1.

Visualization composition framework 122 is communicatively coupled to manifest system 127. Visualization composition framework 122 may construct an output visualization based on input options from the user (e.g., custom module or manifest definitions) and/or existing module and/or chart manifests in the manifest system 127 respectively.

Manifest system 127 includes various types of existing modules 302a-e, such as a chart module (i.e. bar module 302a), supplementary modules (e.g., title module 302b, legend module 302c), a container module (e.g., XYContainer module 302d) and possibly other module 302e that represents any other module. Each module 302a-e is associated with a respective module manifest 304a-e that defines the features of the module 302a-e. For instance, bar module 302a is associated with manifest of bar module 304a, title module 302b is associated with manifest of title module 304b, legend module 302c is associated with manifest of legend module 304c, XYContainer module 302d is associated with manifest of XYContainer module 304d, and other module 302e is associated with manifest of other module 304e.

Each module manifest 304a-e may further be associated with a chart manifest 306a-b respectively. In some implementations, multiple module manifests 304a-e are associated with each chart manifest 306a or 306b. Each chart manifest describes how a chart is composed of various modules. For instance, a manifest of bar chart 306a may describe how a bar chart is composed of a bar module 302a, a title module 302b, a legend module 302c, an XYContainer module 302d, and other module 302e. The chart manifest may "reference" one or more modules from the manifest system 127, and specify special properties of the modules to generate "instantiations" of those modules.

Figure 3B:
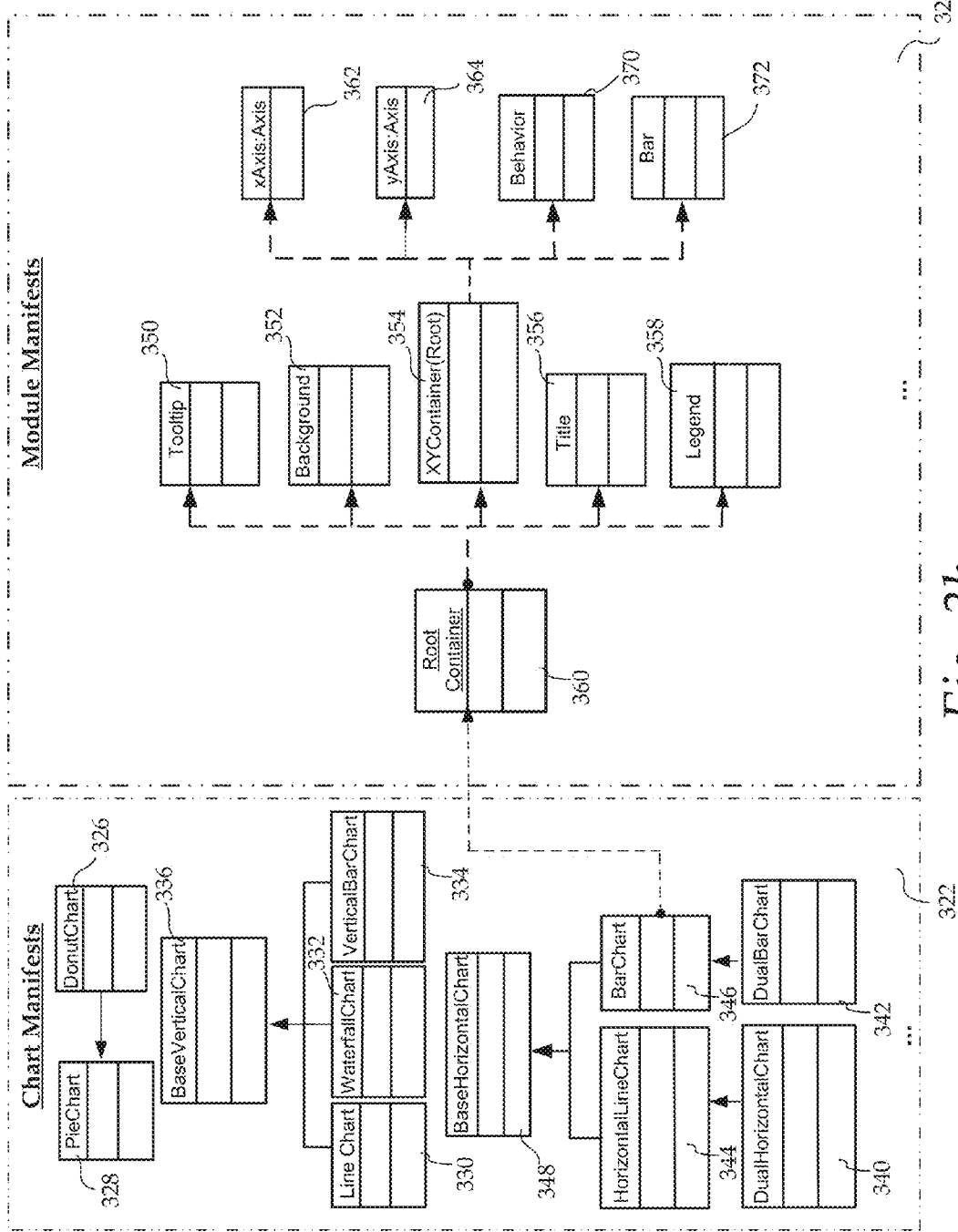
FIG. 3b shows exemplary structures of various types of chart manifests and module manifests.

FIG. 3b shows exemplary structures of various types of chart manifests 322 and module manifests 324. Generally, a solid arrow indicates an inheritance relationship, while an arrow with a broken line indicates a reference relationship.

More particularly, a solid arrow from a first manifest to a second manifest indicates an inheritance relationship where the second manifest is inheriting attributes or behavior from the first manifest (i.e. base). For instance, to simplify definition of a module manifest, a chart manifest may inherit certain attributes or behavior from a pre-existing parent chart manifest. As shown, donut chart manifest 326 may inherit from pie chart manifest 328; line chart manifest 330, waterfall chart manifest 332 and vertical bar chart manifest 334 may inherit from base vertical chart manifest 336; dual horizontal chart manifest 340 and dual bar chart manifest 342 may inherit from horizontal line chart manifest 344 and bar chart manifest 346 respectively, which may both inherit from base horizontal chart manifest 348.

An arrow with a broken line from a third manifest to a fourth manifest indicates a reference relationship where the third manifest includes a reference to the fourth manifest. For example, a chart manifest may reference one or more module manifests to compose a chart. As shown, bar chart manifest 346 may reference root container manifest 360. Module manifests may also reference other module manifests. For instance, root container manifest 360 may reference Tooltip manifest 350, Background manifest 352, XYContainer (Root) manifest 354, title manifest 356 and legend manifest 358. XYContainer(Root) manifest 354 may further reference xAxis:Axis manifest 362, yAxis:Axis manifest 364, Behavior manifest 370 and Bar manifest 372.

FIG. 4a shows an exemplary structure 402 of a module manifest file. The module manifest file may be used to define a supplementary-type, chart-type, container-type or behavior-type module. As shown, each module may be defined by specifying values for keywords: id (or unique identifier), name, type, base, properties, events and css (or cascading style sheet). To simplify the definition, the keyword 'base' may be used to indicate a base module from which definitions are inherited or overridden.

FIG. 4b shows an exemplary item 412 to be added to the structure 402 of a module manifest file for a container-type module. More particularly, the item 412 includes the keyword 'layout' that may be used to define the default layout (e.g., table, grid, etc.) for the particular container-type module.

FIG. 4c shows an exemplary structure 422 for a layout module manifest file. As discussed previously, a layout-type module is responsible for arranging the sub-modules of the container-type module that it is assigned to. As shown, each layout-type module may be defined by specifying values for keywords: id (or unique identifier), name, base, properties, css (or cascading style sheet) and layout (which describes the layout specification that can be used).

FIG. 4d shows an exemplary structure 432 of a chart manifest file. As discussed previously, a chart manifest mainly defines a chart structure with existing modules and the coordination pattern between the modules. As shown, each chart may be defined by specifying values for keywords: id, name, base, root, dependencies, attributes and events. To simplify the definition, inheritance/override is supported by using the keyword 'base' to indicate the base module identifier. The keyword 'root' specifies the root module reference, which usually refers to a container-type module that contains all its sub-modules.

FIG. 5a shows an exemplary structure of a module reference 500. A reference to module 500 may be included in a manifest file of a chart when using the module to compose the chart. When the visualization composition framework 122 encounters each module references 500, it may search, using the unique module identifier (id) 502, for the original module manifest in the manifest system 127. The metadata from the original module manifest may be merged with the specific information 503 in the module reference, and treated as metadata for that instance of the module in the chart. Specific information 503 may include 'properties' associated with values for certain properties specifically for this reference instance. For example, two titles (e.g., main title and sub title) may be specified for the chart, both of which may reference to the title module.

FIG. 5b shows exemplary structures for the main title 504 and sub title 506 respectively. As shown, different 'properties' values (e.g. 'alignment' values) may be specified for the two titles. For instance, the main title may be configured to align to the 'center', while the sub title may be configured to align to the 'right'.

FIG. 6 shows an exemplary structure of another module reference 602. In this example, the module reference is a container module reference. The keyword 'modules' 604 may be used to specify names of sub-modules. In the main body of the structure 602, the keyword 'layout' 606 may be used to specify a layout module. If no layout module is specified, a default layout may be applied. In each sub-module reference, the keyword 'layout' 608 may be used to provide information to the layout module on how to arrange the sub-module (e.g., column and row information).

FIG. 7 shows an exemplary structure of a module reference 702 with a behavior configuration. To support rich interactions in a chart, a behavior module may be bound to a target module to enable it to support the behavior. As shown, the unique identifier 'id' 704 may be specified in the behavior module reference of the structure 702 to, for example, enable a selection behavior module. The keyword 'properties' may be used to customize property values for the behavior module reference.

FIG. 8 shows an exemplary structure of a value dependency 801. A value dependency 801 may be included in a chart manifest file to specify a dependency relationship between two reference modules based on a value. More particularly, value dependencies may be used to connect modules to make them consistent in a certain aspect. When modules are assembled in a chart, they may need to be consistent in one or more aspects. For instance, the legend module should use the same color palette as the chart plot module; the axis of the legend module should use the same scale as the chart plot module, etc. As shown by the structure 801, the 'target' keyword 806 and the 'source' keyword 808 are used to specify the same 'colorPalette' function, which allows the 'legend' target module and the 'main.plot' source module to share the same color palette.

The keyword 'targetModule' 802 may be used to specify the target module path, while the keyword 'sourceModule' 804 may be used to specify the source module path. A module path is used to find a certain module when the framework is resolving value dependencies. The module path reflects the composition structure of the module from its chart root module. For example, the source module path 'main.plot' indicates that the source module is defined by a module reference named 'plot', which is a child of another module reference named 'main'.

Any module may have any dependency on any other module via the specified source and target functions. With object dependency, interfaces for all possible dependencies may have to be predefined. In other words, modules that are depended upon by other modules may need to be configured with interfaces. This may limit the implementation of the other modules. For instance, if module A depends on module B based on the function X, any other module C that wants to be depended on by module A should have the same signature as function X. The implementation of module C may be limited, given that module C may use function X for other functionality. With value dependency, however, the function signature may be included in the value dependency configuration, and module C can use any other function, regardless of its signature, as long as it provides the right value to module A.

FIG. 9 shows a structure of an event dependency 902. The event dependency 902 may be included in a chart manifest to specify the dependency relationship between two modules based on an event. The structure 902 is similar to the value dependency structure 801, as previously described in connection with FIG. 8. As shown, the target module 'tooltip' and the source module 'main.plot' share a dependency relationship based on an event 'hideTooltip'. The source module (e.g., 'main.plot') may fire the event while the target module (e.g., 'hideTooltip') may listen for and respond to the event.

FIGS. 10*a-e* show exemplary interface definitions for modules. As discussed previously, an interface may be defined for each module to coordinate interactions between modules. FIG. 10*a* illustrates an exemplary interface definition that may be used for all types of modules except for behavior-type modules. FIG. 10*b* illustrates an exemplary interface definition for supplementary-type modules. FIG. 10*c* illustrates an exemplary interface definition for behavior-type modules. FIG. 10*d* illustrates an exemplary interface definition for container-type modules. FIG. 10*e* illustrates an exemplary interface definition for chart-type modules.

FIGS. 11, 12*a-c* and 13*a-c* show exemplary manifest samples. More particularly, FIG. 11 illustrates an exemplary bar module manifest sample 1102. FIGS. 12*a-c* illustrate an exemplary bar chart manifest sample 1202. As shown, the bar chart is composed by a title module 1204, a legend module 1206, a tooltip module 1208, a container module 1210 with selection support 1211, a value axis module 1212, a category axis module 1214, a bar module 1216, value dependencies 1218 and event dependencies 1220.

FIGS. 13*a-c* illustrate a multiple bar chart manifest sample 1302. As shown, the multiple bar chart is composed by reusing a single bar chart module 1202 described with reference to FIGS. 12*a-c*. Tooltip support 1302*a-b* and selection support 1304*a-b* are also provided.

Figure 14:
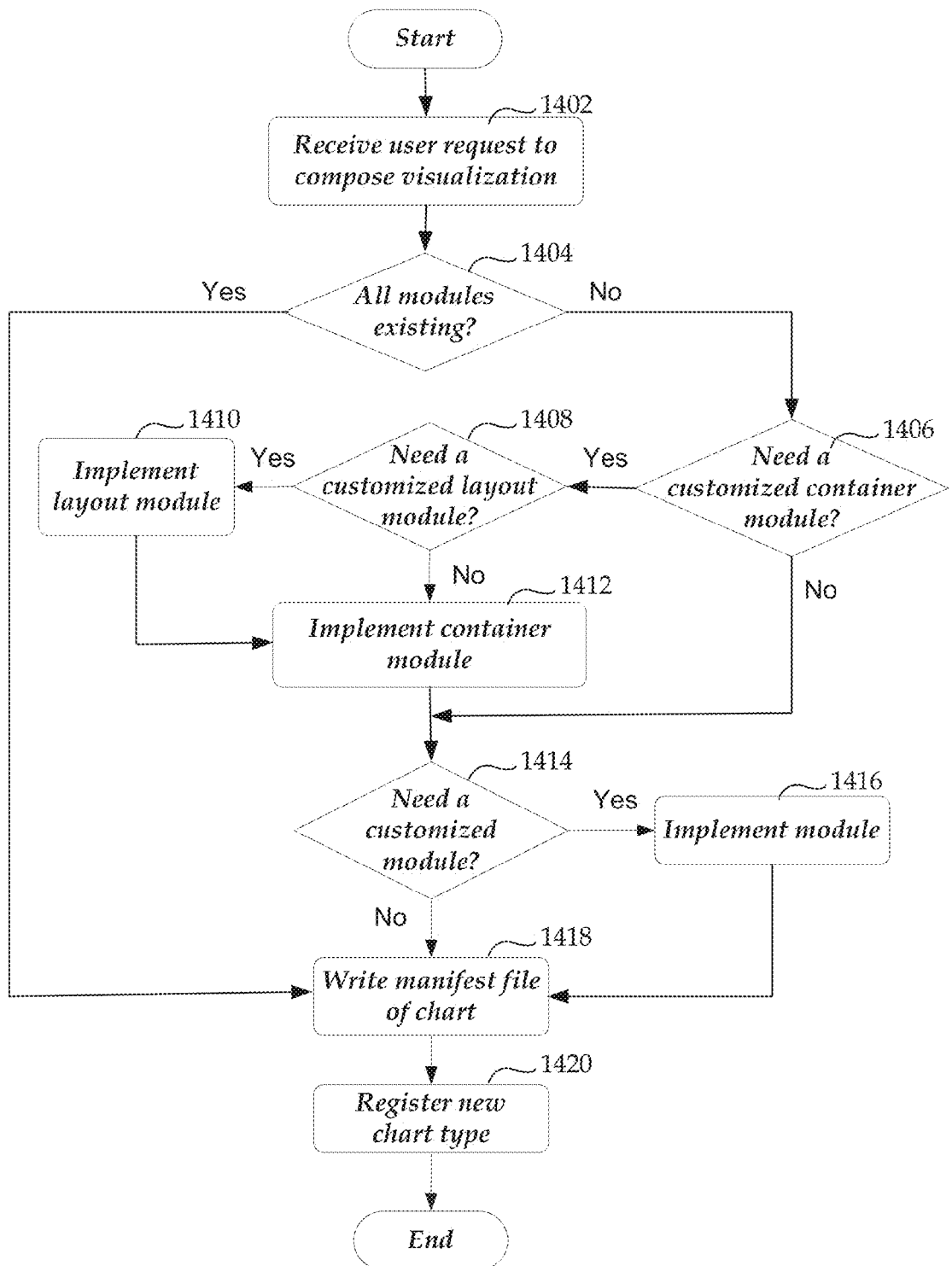
FIG. 14 shows an exemplary process for composing a visualization.

FIG. 14 shows an exemplary process 1400 for composing a visualization. The process 1400 may be performed automatically or semi-automatically by the system 100, as previously described with reference to FIG. 1. It should be noted that in the following discussion, reference will be made, using like numerals, to the features described in FIG. 1.

At 1402, the visualization composition framework 122 receives a request to compose a visualization. Generally, composing a visualization includes creating, modifying and/or importing a visualization. The user request may be received from, for example, a user interacting via the associated user interface 152. The user request may indicate, for example, user selections of desired module or chart manifests for composing the visualization. The user may choose to customize one or more existing modules from the manifest system 127.

At 1404, the visualization composition framework 122 determines if all user selected modules already exist in the manifest system 127. If all the user selected modules already exist, the process 1400 continues to generate the manifest file of the chart at 1418.

At 1406, visualization composition framework 122 determines if a customized container module is required. A customized container module may be required when, for instance, a special coordination pattern, layout or other property not found in an existing container module is required. If only a special layout is required, a customized layout module may be implemented at 1410. If a property other than a special layout is required, a new container module may be implemented at 1412.

More particularly, if a customized container module is required, the process 1400 continues at 1408 to determine if a customized layout module is required. A customized layout module may be required when the pre-existing layout modules in the manifest system 127 do not satisfy the user's requirements. For example, a table layout instead of a default flow chart layout may be required. If a customized layout module is required, the process 1400 continues at 1410 to implement the layout module. The layout module may be implemented by customizing or extending an existing layout module. In some implementations, the user may write the layout module manifest file via the associated user interface 152 to implement the layout module.

If a customized layout module is not required, the process 1400 continues at 1412 to implement a container module. The container module may be implemented by customizing or extending an existing container module. In some implementations, the user may write the container module manifest file via the associated user interface 152. The layout and container module manifest files may be programmed in accordance with the descriptive approach described herein using, for example, simple human-readable language, such as JavaScript Object Notation (JSON), Extensible Markup Language (XML), etc.

If a customized container module is not required, the process 1400 continues at 1414 to determine if a customized module is required. A customized module may be required when existing modules in the manifest system 127 do not meet the user's requirements.

If a customized module is required, the process 1400 continues at 1416 to implement the module. The module may be implemented by customizing or extending an existing module retrieved from the manifest system 127. For example, the user may choose to modify predefined properties, dependencies and/or events in the existing module. In some implementations, the user may write the module manifest file via the associated user interface 152 to implement the customized module. It should be appreciated that in situations where more than one customized module is required, step 1416 may be repeated as many times as desired.

If a customized module is not required or all desired modules already exist in the manifest system 127, the process 1400 continues at 1418 to write a chart manifest file. In some implementations, the user may write the chart manifest file via the associated user interface 152. The chart manifest file may be programmed in accordance with the descriptive approach described herein using, for example, simple human-readable language, such as JavaScript Object Notation (JSON), Extensible Markup Language (XML), etc. In the chart manifest file, the user may choose to reorganize component modules and/or define a new chart type. The user may also replace module implementations (e.g., container, chart or supplementary) in an existing chart type with new modules implemented in steps 1410, 1412 and/or 1416.

At 1420, the new chart type is registered with the manifest system 127 for use in building a new visualization. For instance, the manifest system 127 may invoke a "registerCategory" API to create a new category, and a "register" API to mount the new chart type manifest into the new category. Other methods of registration are also useful.

Figure 15:
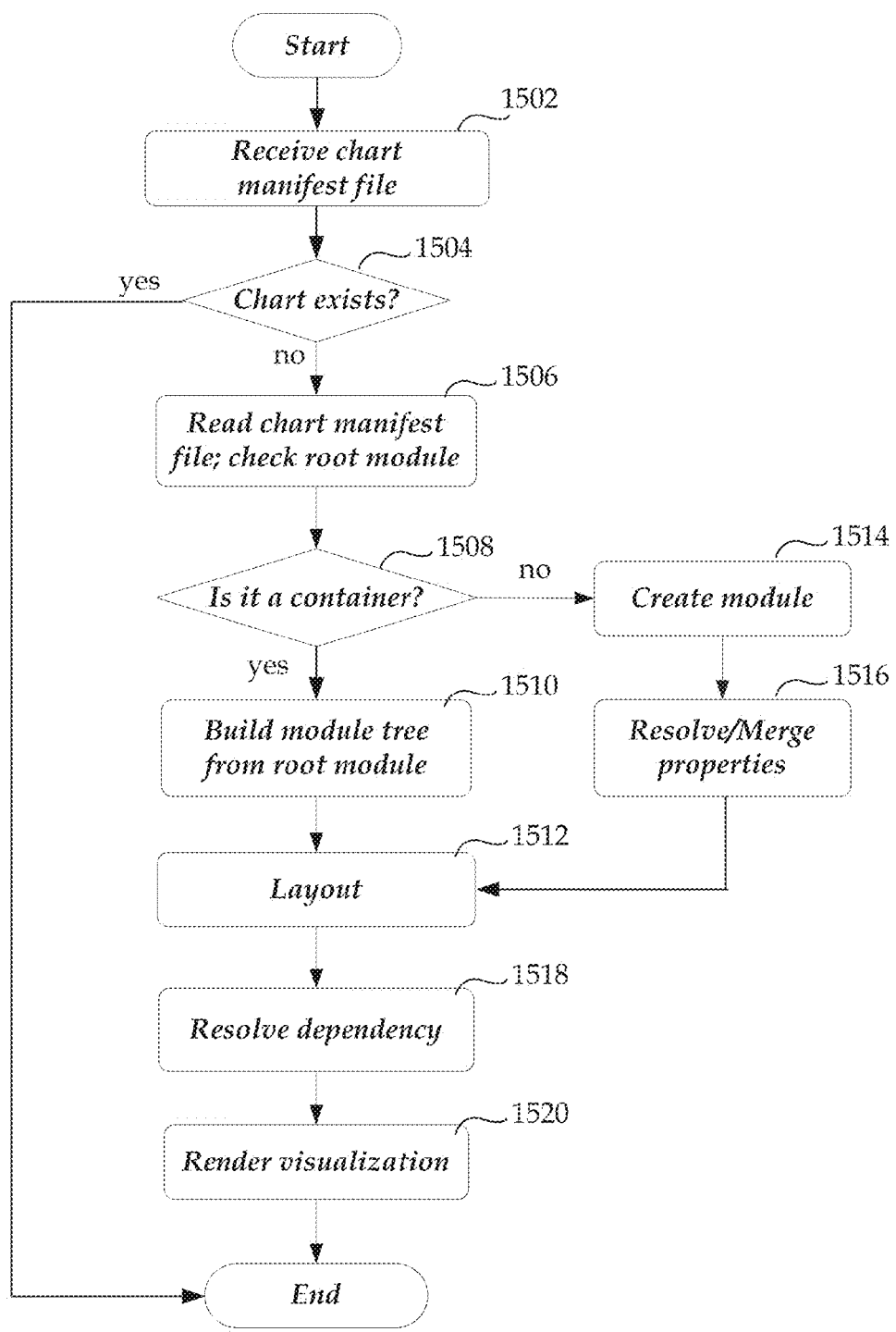
FIG. 15 shows an exemplary process of building a visualization at runtime.

FIG. 15 shows an exemplary process 1500 of building a visualization at runtime. The process 1500 may be performed automatically or semi-automatically by the system 100, as previously described with reference to FIG. 1. It should be noted that in the following discussion, reference will be made, using like numerals, to the features described in FIG. 1.

At 1502, the rendering component 124 receives a chart manifest file. The chart manifest file may be received in response to, for example, a user selection of the chart via the user interface 152.

At 1504, the rendering component 124 determines if the chart associated with the chart manifest exists. The chart exists if its manifest file is "valid" or may be found in the manifest system 127. If the chart already exists, the process 1500 ends. If the chart does not exist, the process continues at 1506.

At 1506, the rendering component 124 reads the chart manifest file and checks its root module. At 1508, the rendering component 124 determines if the root module is a container module. A container module may be optional, and implemented when more than one module is required to compose the visualization. In other words, the container module may not be necessary when only one module is specified to compose the visualization.

If the root module is a container module, at 1510, the rendering component 124 directly builds the module tree from the root module. The module tree is a data structure that represents the reference relationships between the modules. For example, FIG. 3b shows an exemplary module tree in the module manifests section 324. As shown, the root container module 360 references 5 sub-modules (350, 352, 354, 356, 358). The sub-module XYContainer(Root) 354 is also a container-type module that references two axis module instances (362, 364), a behavior module instance 370 and a bar plot module instance 372.

If the root module is not a container module, a new module (instead of a module tree) is created at 1514. At 1516, the rendering component 124 resolves and/or merges properties of the new module. The properties may be specified by the user when creating the chart instance. Alternatively, the properties may be specified in the module reference included in the chart manifest.

At 1512, the rendering component 124 constructs the layout of the chart by using the layout module specified in, for example, the chart manifest. The layout module is responsible for positioning and/or sizing of all module instances. The desired layout properties may be specified by the user or in the module reference included the chart manifest. For instance, referring to FIG. 12b, the common container module may be configured to use the default layout module (e.g., border layout module). The default layout module may be configured by indicating one or more desired properties 1213 in the chart manifest. The default layout module may then arrange sub-modules based on the indicated properties 1213.

At 1518, the rendering component 124 resolves any dependencies between modules referenced in the chart manifest. In some implementations, value and/or event dependencies are resolved. The dependencies are resolved to generate a dependency configuration that connects all the module instances. Step 1518 is generally performed after step 1512 as some dependencies are related to the size of layout components.

At 1520, the rendering component 124 renders a visual representation of the chart. The rendering may be performed based on the module tree determined by step 1510 or the single module created by steps 1514-1516. In some implementations, each child module instance in the module tree may be assigned a rendering element from its parent module instance. Each rendering element may be processed to render a visual component of the chart.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented descriptive method of data visualization, comprising:
providing pre-defined module manifests in a manifest system stored in a non-transitory computer-readable medium, wherein at least one of the pre-defined module manifests is a first configuration file that describes features of a module, wherein the module represents a particular component of a visualization;
generating a new module manifest based on at least one of the pre-defined module manifests, wherein the new module manifest is a second configuration file that describes the features of the module;
generating a chart manifest referencing the new module manifest, wherein the chart manifest is a third configuration file that describes the visualization by specifying a relationship between the module of the new module manifest and another component module; and
rendering the visualization based on the chart manifest.

2. A computer-implemented descriptive method of data visualization, comprising:
providing module manifests, wherein at least one of the module manifests is a first configuration file that describes features of a module, wherein the module represents a particular component of a visualization;
coordinating the module manifests by defining a chart manifest, wherein the chart manifest is a second configuration file that describes the visualization by specifying one or more relationships between modules of the module manifests; and
rendering the visualization based on the chart manifest.

3. The method of claim 2 wherein the module comprises a container-type module that contains sub-modules.

4. The method of claim 3 wherein the container-type module specifies a layout-type module that arranges the sub-modules.

5. The method of claim 2 wherein the module comprises a supplementary-type module that facilitates user interpretation of data.

6. The method of claim 5 wherein the supplementary-type module comprises a title module, an axis module, a legend module or a tooltip module.

7. The method of claim 2 wherein the module comprises a chart-type module that represents data in a visual form.

8. The method of claim 7 wherein the chart-type module comprises a bar module, a line module, a pie module, a scatter or bubble plot module or a radar module.

9. The method of claim 2 wherein the module comprises a behavior-type module that defines behavior of the visualization.

10. The method of claim 2 wherein providing the one or more module manifests comprises providing a JavaScript file.

11. The method of claim 2 wherein providing the module manifests comprises implementing a new module manifest based on a pre-defined module manifest in a manifest system.

12. The method of claim 11 further comprises customizing property values for the new module manifest.

13. The method of claim 2 wherein defining the chart manifest comprises defining a JavaScript file.

14. The method of claim 2 wherein the chart manifest is defined based on a pre-defined chart manifest.

15. The method of claim 2 wherein defining the chart manifest comprises specifying a value dependency between two modules.

16. The method of claim 2 wherein defining the chart manifest comprises specifying an event dependency between two modules.

17. A non-transitory computer-readable medium having stored thereon program code, the program code executable by a computer to:
provide module manifests, wherein at least one of the module manifests is a first configuration file that describes features of a module, wherein the module represents a particular component of a visualization;
coordinate the module manifests by defining a chart manifest, wherein the chart manifest is a second configuration file that describes the visualization by specifying one or more relationships between modules of the module manifests; and render the visualization based on the chart manifest.

18. The non-transitory computer-readable medium of claim 17 wherein the module comprises a container-type module, a layout-type module, a supplementary-type module, a chart-type module or a behavior-type module.

19. A system comprising:

a non-transitory memory device for storing computer-readable program code; and a processor in communication with the memory device, the processor being operative with the computer-readable program code to provide module manifests, wherein at least one of the module manifests is a first configuration file that describes features of a module, wherein the module represents a particular component of a visualization, coordinate the module manifests by defining a chart manifest wherein the chart manifest is a second configuration file that describes the visualization by specifying one or more relationships between modules of the module manifests, and render the visualization based on the chart manifest.

20. The system of claim 19 wherein the module comprises a container-type module, a layout-type module, a supplementary-type module, a chart-type module or a behavior-type module.

\* \* \* \* \*